US012732729B2

(12) United States Patent
Jobin

(10) Patent No.: US 12,732,729 B2
(45) Date of Patent: Sep. 8, 2026

(54) SOUND COMMUNICATION SYSTEM INCLUDING MICROPHONE AND PERSONAL AUDIO OUTPUT DEVICE

(71) Applicant: Jennifer Jobin, Winnipeg (CA)

(72) Inventor: Jennifer Jobin, Winnipeg (CA)

( * ) Notice: Subject to any disclaimer, the term of this patent is extended or adjusted under 35 U.S.C. 154(b) by 202 days.

(21) Appl. No.: 18/449,974

(22) Filed: Aug. 15, 2023

(65) Prior Publication Data

US 2024/0056715 A1 Feb. 15, 2024

Related U.S. Application Data

(60) Provisional application No. 63/398,003, filed on Aug. 15, 2022.

(51) Int. Cl.
*H04R 1/08* (2006.01)
*H04R 1/02* (2006.01)
*H04R 1/10* (2006.01)

(52) U.S. Cl.
CPC ............... *H04R 1/08* (2013.01); *H04R 1/025* (2013.01); *H04R 1/10* (2013.01); *H04R 2460/17* (2013.01)

(58) Field of Classification Search
CPC . H04R 1/08; H04R 1/025; H04R 1/10; H04R 2460/17; H04R 2227/005; H04R 2227/003; H04R 3/12; H04B 5/00; H04B 3/00; H04B 1/00
USPC ................ 381/355, 311, 61, 77, 82, 85, 119
See application file for complete search history.

(56) References Cited

U.S. PATENT DOCUMENTS 10,433,089 B2 * 10/2019 Wilson ................ G10L 21/0364
2003/0021189 A1 * 1/2003 Streja ...................... G04F 1/005 368/62
2012/0189140 A1 * 7/2012 Hughes ................... H04M 3/56 381/123

* cited by examiner

*Primary Examiner* — Ahmad F. Matar
*Assistant Examiner* — Sabrina Diaz
(74) *Attorney, Agent, or Firm* — Adrian D. Battison; Ryan W. Dupuis; Ade & Company Inc.

(57) ABSTRACT

A communication system for transmitting sound from a speaker to one or more listeners comprises a microphone configured to capture sound from the speaker and at least one personal audio output device respectively configured to be worn by the listeners. Each personal audio output device is in operative communication with the microphone to receive the captured sound therefrom. The respective audio device comprises a housing configured to be worn by the respective listener; a speaker assembly arranged to be located adjacent ears of the respective listener for emitting sound to the listener's ears; and a sound generation module operatively connected to the speaker assembly and configured to emit sound via the speaker assembly to the respective listener. The respective audio device is configured to concurrently emit, via the speaker assembly, to the respective listener, sound from the microphone and sound from the sound generation module.

14 Claims, 5 Drawing Sheets

SOUND COMMUNICATION SYSTEM INCLUDING MICROPHONE AND PERSONAL AUDIO OUTPUT DEVICE

This application claims the benefit under 35 U.S.C. 119(e) of U.S. provisional application Ser. No. 63/398,003 filed Aug. 15, 2022, which is incorporated by reference herein.

FIELD OF THE INVENTION

The present invention relates generally to a communication system for transmitting sound from a speaker to one or more listeners, and more particularly to such a system including a microphone for the speaker and personal audio output devices configured to be worn by the listeners.

BACKGROUND

Sound wave and frequency therapy is proving to be very beneficial in many uses including neurodiversity, mental health issues and testing for anxiety and for tinnitus. Adults and children living with attention deficit hyperactive disorder (ADHD), autism or anxiety disorders most often have difficulty with an overactive or over stimulated brain that is paying attention to every single external stimulus that is in its environment. These external stimuli can aggravate the brain to a point where it gets overwhelmed with the sensory input, which for a child or adult with these disabilities, leads to the inability to focus and listen and control which stimulus it wants to pay attention to resulting in brain executive function overwhelm. Sound waves can also calm nervous system overwhelmed in anxiety and depression, and certain sound frequencies have been shown to assist in improving the qualify of life of people who have tinnitus.

The external noise stimuli are also louder and more intensified in a neuro-diverse person's brain and person with anxiety leading to more overwhelm and agitation, further compounding the difficulty to maintain behaviour composure and focus on the requested task. The external stimuli aggravates the brain to a point where it cannot focus and is pulled in so many directions and leads to behavioural issues and reactions in children and difficulty in focusing and listening, reading and comprehension in teens and adults. In tinnitus sufferers, this technology can counteract the ear ringing that they experience so that they can hear their world better.

It is therefore difficult for such individuals to focus in a classroom-like or public address-like setting, where there is sound on which the individuals are to focus, such as from a speaker, and competing environmental noises.

SUMMARY OF THE INVENTION

According to an aspect of the invention there is provided a communication system for transmitting sound from a speaker to one or more listeners comprising:

- a microphone configured to capture sound from the speaker;
- at least one personal audio output device distinct from the microphone and respectively configured to be worn by the one or more listeners, wherein the at least one personal audio output device is in operative communication with the microphone to receive the sound therefrom, wherein each of the at least one personal audio output device comprises:
  - a housing configured to be worn by a respective one of the listeners,
  - a speaker assembly supported by the housing and arranged to be located adjacent ears of the respective listener for emitting sound to the listener's ears, and
  - a sound generation module in the housing, wherein the sound generation module is operatively connected to the speaker assembly and configured to emit sound via the speaker assembly to the respective listener;
- wherein each personal audio output device is configured to concurrently emit, via the speaker assembly, to the respective listener, sound from the microphone and sound from the sound generation module.

This arrangement is suitable for a public address system in which communication is unidirectional, that is from a speaker to listeners thereof.

In one arrangement, the sound generation module comprises an active noise cancellation submodule configured to emit, via the speaker assembly, noise-cancelling sound in response to ambient noise.

In one arrangement, the sound generation module comprises a playback submodule configured to emit, via the speaker assembly, at least one of coloured noise and theta brain wave audio signals.

Preferably, the at least one personal audio output device and the microphone are in wireless communication.

In one such arrangement, wireless communication between the at least one personal audio output device and the microphone is by Bluetooth.

According to an aspect of the invention there is provided a communication system for transmitting sound from a speaker to one or more listeners comprising:

- a microphone configured to capture sound from the speaker;
- at least one personal audio output device and respectively configured to be worn by the one or more listeners, wherein the at least one personal audio output device is in operative communication with the microphone to receive the sound therefrom, wherein each of the at least one personal audio output device comprises:
  - a housing configured to be worn by a respective one of the listeners,
  - a speaker assembly supported by the housing and arranged to be located adjacent ears of the respective listener for emitting sound to the listener's ears;
  - a captured sound module in the housing and operatively connected to the microphone so as to be configured to receive, as input thereto, the sound captured by the microphone, wherein the captured sound module is configured to form a first sound signal including the sound captured by the microphone;
  - a sound generation module in the housing and operatively connected to an audio source storing one or more prerecorded audio files, wherein the sound generation module is configured to output a second sound signal from the audio source; and
  - a mixing module in the housing and operatively connected to the captured sound module and the sound generation module so as to be configured to receive, as input thereto, the first and second sound signals, wherein the mixing module is configured to form a combined sound signal including the first and second sound signals, and wherein an output of the mixing module is operatively connected to the speaker assembly to emit the combined sound signal to the respective listener.

Typically, when the communication system is used to assist listeners in focusing on the speaker, the second sound signal from the audio source is associated with sound wave therapy.

In one arrangement, the one or more prerecorded audio files include at least one of (i) coloured noise and (ii) theta brain wave audio signals.

In one arrangement, the microphone is distinct from the at least one personal audio output device.

Preferably, in such an arrangement, the captured sound module of the at least one personal audio output device and the microphone are operatively wirelessly interconnected.

In one such arrangement, the captured sound module and the microphone are operatively wirelessly interconnected by Bluetooth.

In one arrangement, the microphone comprises at least one microphone and the housing of each of the at least one personal audio output device is configured to support a respective one of the at least one microphone.

Preferably, each of the captured sound module and the sound generation module are configured to amplify an input signal thereto independently of one another.

In one arrangement, the at least one personal audio output device further includes a timer module configured to count an elapsed time and operatively connected to the speaker assembly to output, to the respective listener, an audible signal representative of the elapsed time.

In one arrangement, when the sound generation module includes a playback submodule configured to output sound from the audio source, the sound generation module further includes an active noise cancellation submodule operatively connected to the microphone and configured to form noise-cancelling sound responsive to ambient sound captured by the microphone.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

The accompanying figures show a communication system, generally indicated at 10, for transmitting sound, typically in the form of speech, from a speaker or presenter 1, that is a person who is speaking, to one or more listeners or audience members 3, that is one or more persons who are listening. The communication system 10 is particularly but not exclusively suited for use as a public address system, that is it is particularly suited for unidirectional communication of sound.

Figure 2:
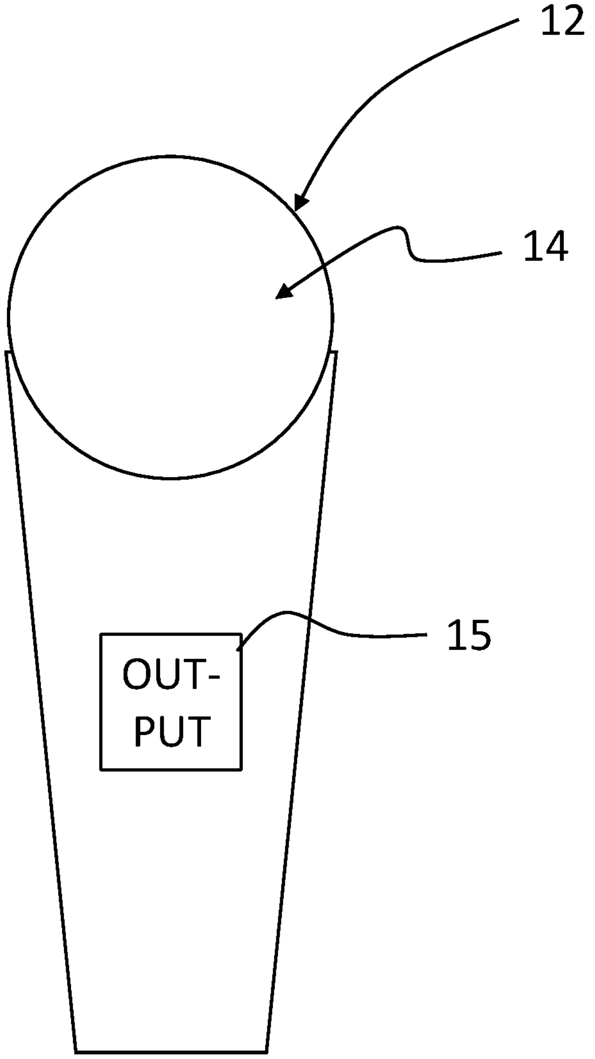
FIG. 2 is a schematic diagram of a microphone of the arrangement of FIG. 1.

The communication system 10 generally comprises a microphone 12 configured to capture sound, for example speech, from the speaker 1. With reference to FIG. 2, the microphone 12 is of a generally conventional configuration and comprises a housing 13, a transducer 14 supported by the housing and configured to convert an input sound to an electrical signal and an output 15 operatively connected to the transducer 14 and configured to transmit the electrical signal produced thereby based on the sound input to the transducer.

The communication system 10 additionally generally comprises one or more personal audio output devices 18 respectively configured to be worn by the one or more listeners 3.

Figure 1:
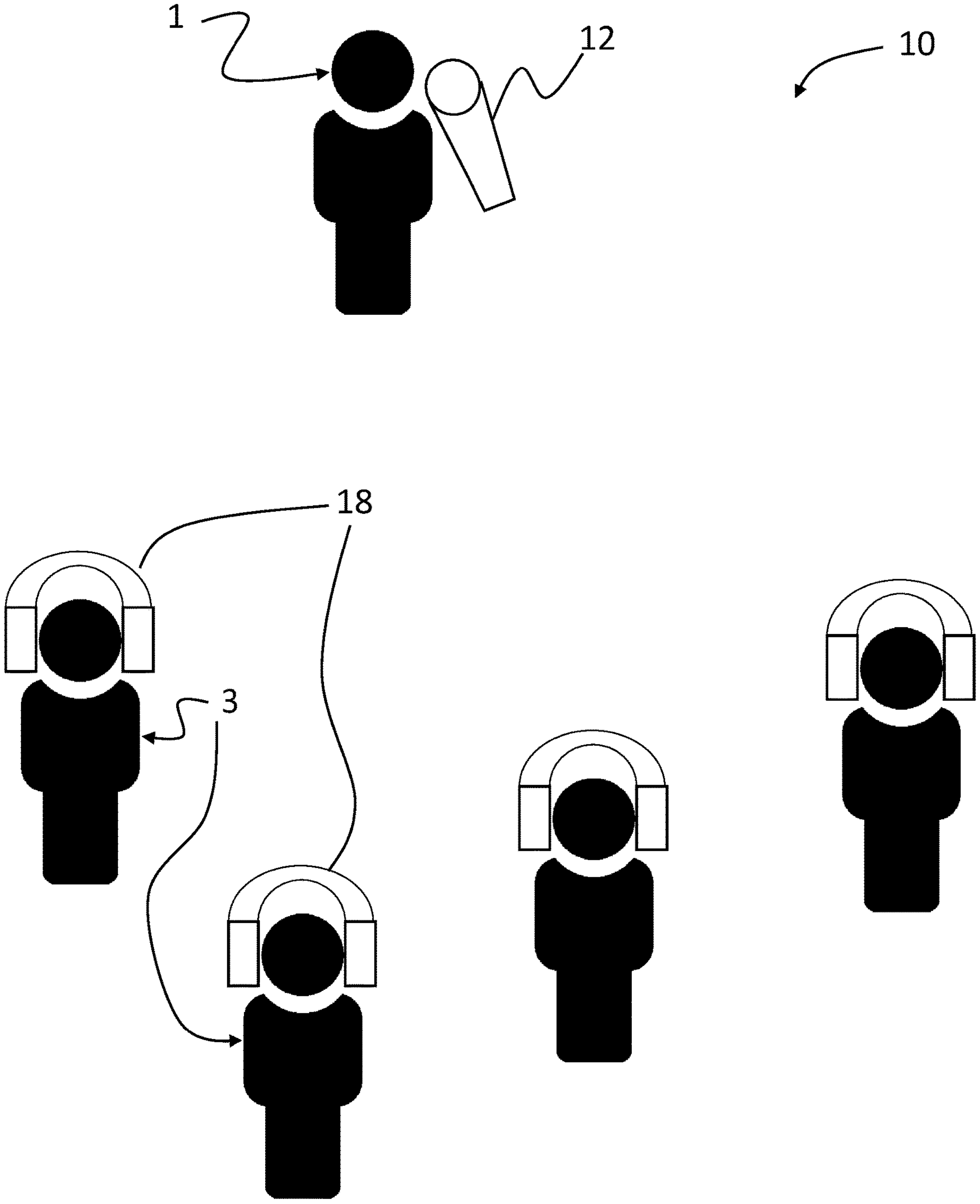
FIG. 1 is a schematic diagram of an arrangement of communication system according to the present invention.
Figure 3:
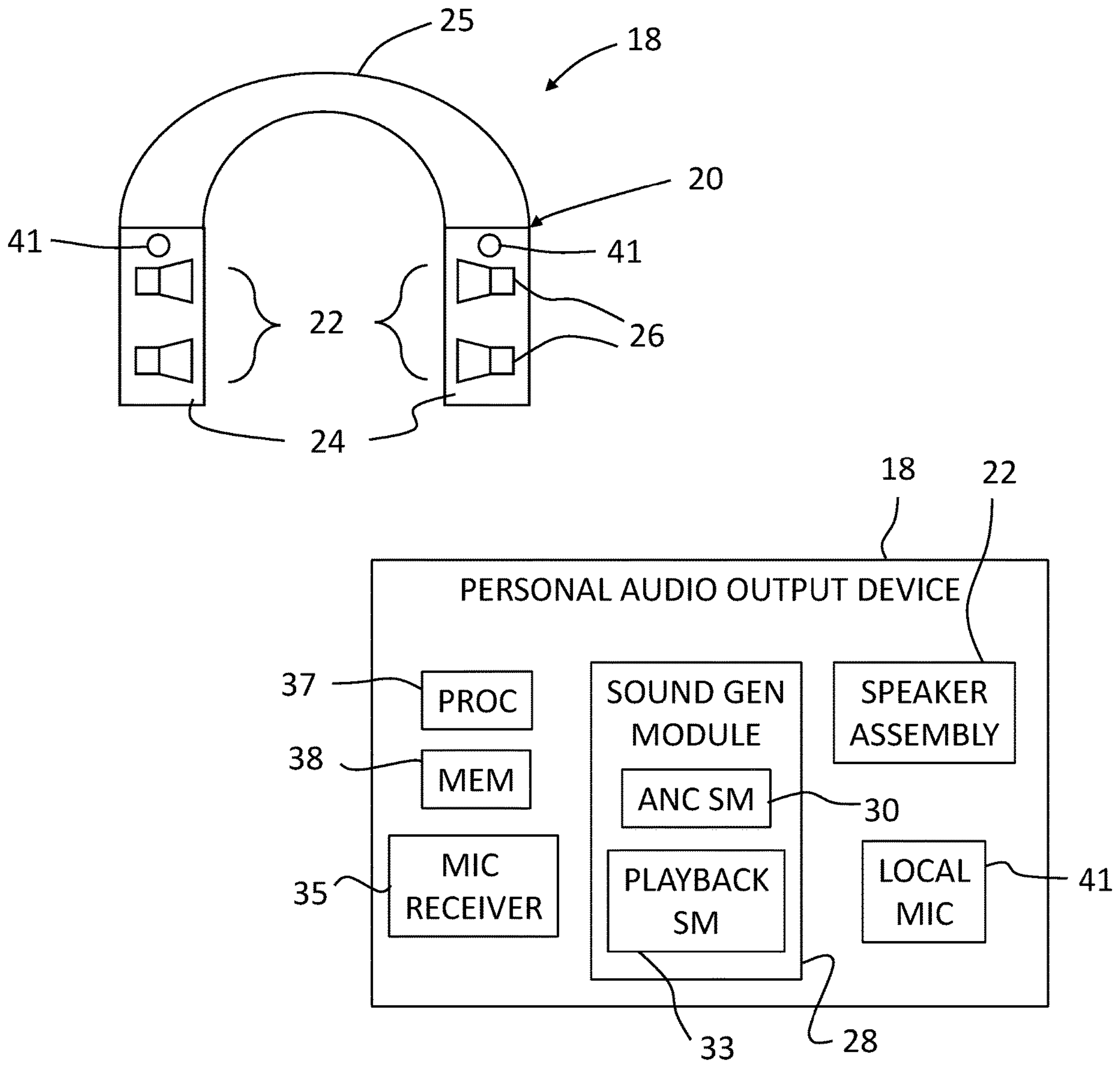
FIG. 3 is a schematic diagram of an arrangement of personal audio output device of communication system of the present invention.
Figure 4:
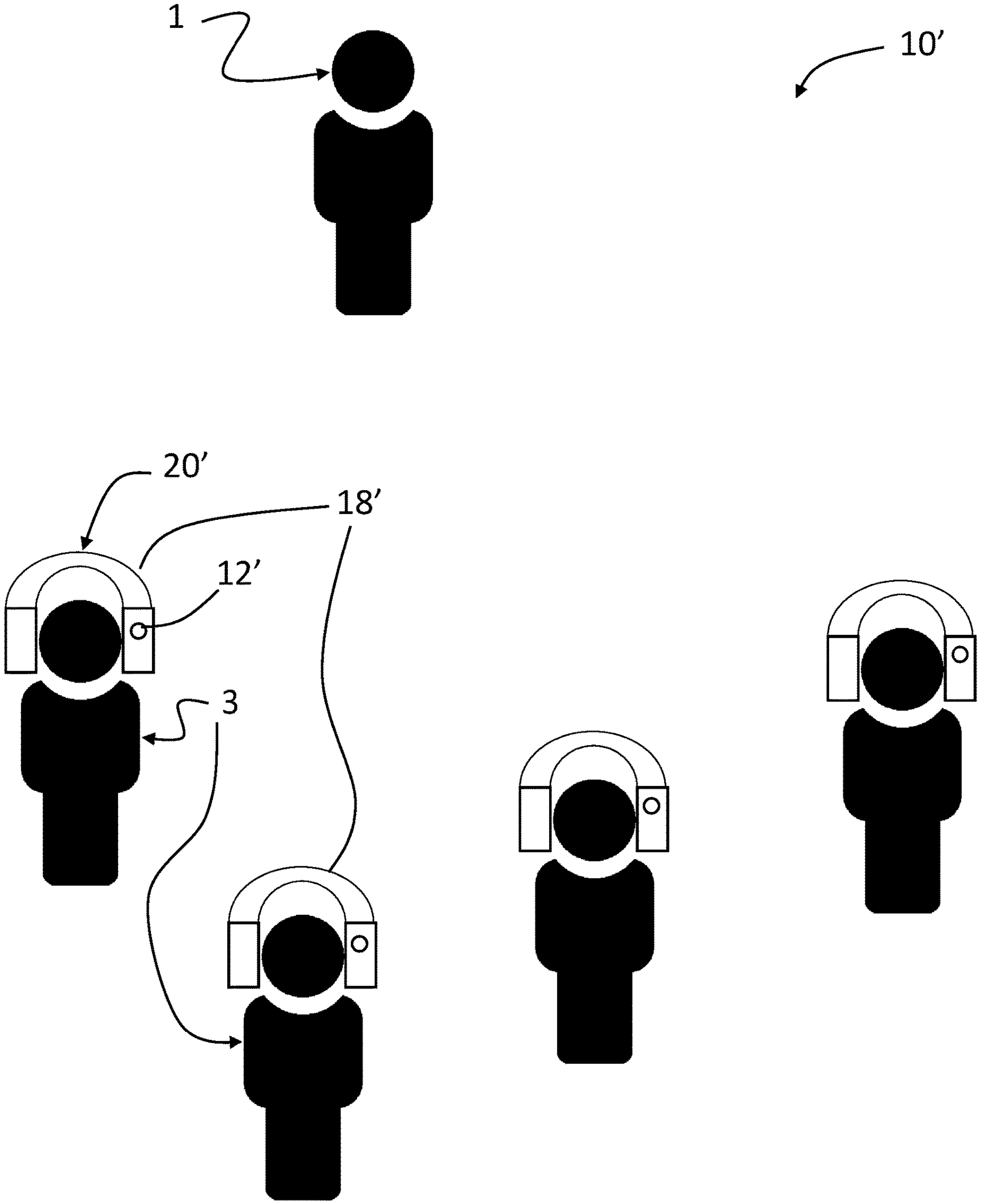
FIG. 4 is a schematic diagram of another arrangement of communication system according to the present invention.

Since the speaker is a different individual than any one of the listeners and is typically located in remote relation to one or more of the listeners, in one arrangement as represented by FIGS. 1-3, the personal audio output devices 18 are distinct from the microphone, so as to be separate devices and respectively located at a distance therefrom. In the illustrated arrangement, there are a plurality of personal audio output devices 18 for a plurality of listeners. In the arrangement with distinct microphone relative to the personal audio output devices, the personal audio output devices 18 are in respective operative communication with the microphone 12 to receive sound therefrom, which is captured from the speaker or presenter 1. More specifically, the audio devices 18 receive the captured sound in the form of an input electrical signal, output from the microphone 12, which is converted back to sound emitted to the listener. In the illustrated arrangement, the personal audio output devices 18 are in respective wireless communication with the microphone 12, specifically by a near or short-range electromagnetic coupling technology such as Bluetooth. Therefore, the microphone 12 is arranged to send, from its output 15, sound data directly to each of the personal audio output devices 18.

Each personal audio output device 18 comprises a housing 20 configured to be worn by a respective one of the listeners 3 and a speaker assembly 22 supported by the housing 18 and arranged to be located adjacent ears of the respective listener for emitting sound to the listener's ears. Generally speaking, each personal audio output device 18 comprises a pair of earphones, so that ear drums of the respective listener are covered by the device 18. In such an arrangement, the housing 18 comprises a pair of distinct ear pieces 24 received on or in the listener's ears, for example in the form of buds or cups, so as to be configured to be supported by the listener's ears, and optionally includes a band 25 interconnecting the ear pieces 24. In the arrangement of earphones, the speaker assembly 22, which comprises one or more individual (sound) drivers 26, for example tweeters, for each ear, is supported by the ear pieces 24 so as to be carried thereby.

Further to the housing 20 and speaker assembly 22, the personal audio output devices 18 each comprise a sound generation module 28 in the housing 20. Typically, the sound generation module 28 is carried in the housing in one of the ear pieces 24. The sound generation module 28 is operatively connected to the speaker assembly 22 and configured to emit sound via the speaker assembly 22 to the respective listener 3. That is, the sound generation module 28 is a local source of sound for the listener, while the microphone 12 is a remote source, both of which can be output to the listener.

More specifically, the sound generation module 28 comprises at least one of, and preferably both, an active noise cancellation (ANC) submodule 30 configured to emit, via the speaker assembly 22, noise-cancelling sound in response to ambient noise and a playback submodule 33 configured to emit, via the speaker assembly, at least one of coloured noise and theta brain wave audio signals, which are focus-enhancing sounds. The submodules 30 and 33 are configured to selectively emit a corresponding one of noise-cancelling sound and focus-enhancing sound, that is each of these sounds can be activated or off.

In order to assist the listeners 3 in focusing on the sound emitted from the speaker 1, each personal audio output device 18 is configured to concurrently emit, via the speaker assembly 22, to the respective listener 3, sound from the remote microphone 12 and sound from the local sound generation module 28.

To facilitate the foregoing functionality, the illustrated arrangement of audio output device 18 comprises a microphone input 35 which is in operative communicative connection with the microphone output 15 to receive sound data therefrom. Thus the input 30 of the device 18 may be referred to as a microphone (mic) receiver 35. In the illustrated arrangement, the microphone input 35 is operatively communicatively connected with the microphone output 15 by wireless inter-device communication protocol or technology, such as Bluetooth.

Furthermore, each personal audio output device 18 comprises a processor 37 and non-transitory memory 38 storing instructions thereon which are executable on the processor 37 to perform various processes and steps. The sound generation module 28 is stored on the memory 38, and accordingly so are the submodules 30, 33 for noise cancellation and playback. While active noise-cancellation involves sensing of ambient or environmental noise and generating a signal to cancel the same, instructions for which are in the corresponding submodule 30 stored in memory 38, focus-enhancing sounds are stored in memory 38 as previously recorded sound files available for retrieval, that is for playback. The personal audio output device 18 is therefore configured to receive user-input, for example by voice activation or manual input by way of tactile buttons carried on the housing 20, to select and activate or play a desired one of the focus-enhancing sounds.

The mic receiver 35 is in operative communicative connection with the speaker assembly 22 to output the transmitted sound from the microphone 12 for emission to the listener. For example, the mic receiver 35 may be operatively connected with the speaker assembly 22 via the processor 37 which determines whether and how to output sound from plural sources, that is from the microphone 12 and from the sound generation module 28, to the listener wearing the respective device 18.

For active noise cancellation, to measure the ambient noise, each of the personal audio output devices 18 comprises a local microphone 41 supported on the device housing 20. In the illustrated arrangement, in which the audio device 18 has earpieces 24, there is a microphone 41 carried in each one thereof.

The audio output device may be in the form of ear buds, so as to have distinct earpieces; or in the form of headphones, having earpieces interconnected with a band; or in the form of a headband, having earpieces carried by a band in the form of an endless loop receivable on the listener's head.

This arrangement is suitable for a public address system in which communication is unidirectional, that is from a speaker to listeners thereof. It is also particularly suited for plural listeners receiving sound from a common speaker or presenter.

Thus, each of the audio output devices 18 is associated with a different one of the listeners and provides sound captured by the microphone 12 to that listener only.

The communication system 10 may be used in classrooms, in which setting the system 10 may promote inclusivity and limit the amount of isolation that is required for students with difficulties focusing. The system 10 is suitable for students with a range of assistance need a little bit of assistive technology to reach greater potentials for their learning needs and avoid the psychological impact of reactive discipline and isolation resulting from the overstimulated brain and older students and adults in post-secondary institution as well as workplaces to have assistive technology to focus on their lectures and presentations, reading or writing and listening or additional focus in their work spaces related to variety of external noises, allowing for increased work productivity.

An aspect of the disclosed invention is to make available assistive technology that is geared towards use in classrooms, lecture theatres and workplaces and other environments where the user, that is a listener, desires the use of noise cancellation/filtration and color sounds (brown and white noise for example) and theta wave technology soothes and calms the brain so that it can focus on just one thing as opposed to all the things in their environments or just relax.

Different styles of personal audio output device may be provided, differing mainly by the form of the housing, for different sensory/psychological needs most notably for listeners with ADHD and autism and anxiety management and focus in classroom, lecture, office and at rest. The different varieties of ear wear provide different functionality to the end user (listener) and psychological wellness.

The noise cancellation headphones with the over earpiece may be particularly suited for young children and adults and older adults who do not tolerate earbuds in their ears. The earbuds may be particularly suited for teens who do not want the look of an over the head headpiece that may make them self-conscious that they are looking different than the rest of their peers, so earbuds are more discrete and more psychologically sensitive to the teenager.

The third ear wear tech option is a comfort sleep band that also includes the same technologies of noise cancellation/filtration, Bluetooth technology colour sounds and Theta waves, volume control, on off, and sound selection for each set of ear wear. The comfort band option is to allow the brain to focus on sleeping and not be thinking all the things at rest or distracted by noises to prevent sleep from occurring allowing for easier and shorter transition to sleep and are comfortable enough to wear through the night with pieces to assist with keeping the ear wear in place through the night and can transmit an alarm via Bluetooth to wake in the am.

The three styles or arrangement of audio device have noise cancelling options and a plurality of color noises pre-installed, preloaded or otherwise stored thereon so as to operate to play such sounds to the listener without connection to a peripheral computing device, for example a smartphone.

In one arrangement, there is a Bluetooth microphone separate of the ear wear and connected thereto for lecturing or teaching, in which case the mic can be worn by instructor or placed in front of the instructor or worn by the headphone wearer to enhance conversation with others. The ear wear may be connected to the mic via Bluetooth so that the student can also have the option to listen to their teacher/instructor through the sound colors and theta waves for better focus and retention while the brain is calmer and turn the mic on and off as needed.

In one such arrangement, the microphone is connected to Bluetooth and used to isolate the voice and clean external noise and transmit to the ear pieces where the earbuds/headphones minimize distraction and play sounds/waves at the person level to minimize external noise stimuli near the student/person and assist focus and listening to the voice input.

In another arrangement of communication system indicated at 10', there is provided a plurality of microphones 12' respectively supported by housings 20' of the personal audio output devices 18', such that the microphone for capturing sound from the speaker and each of the personal audio output devices are integrated into a singular device to be worn by each of the listeners. Besides form of the microphone, the personal audio output device in this configuration or arrangement of communication system otherwise has similar design and functionality to that described earlier.

Figure 5:
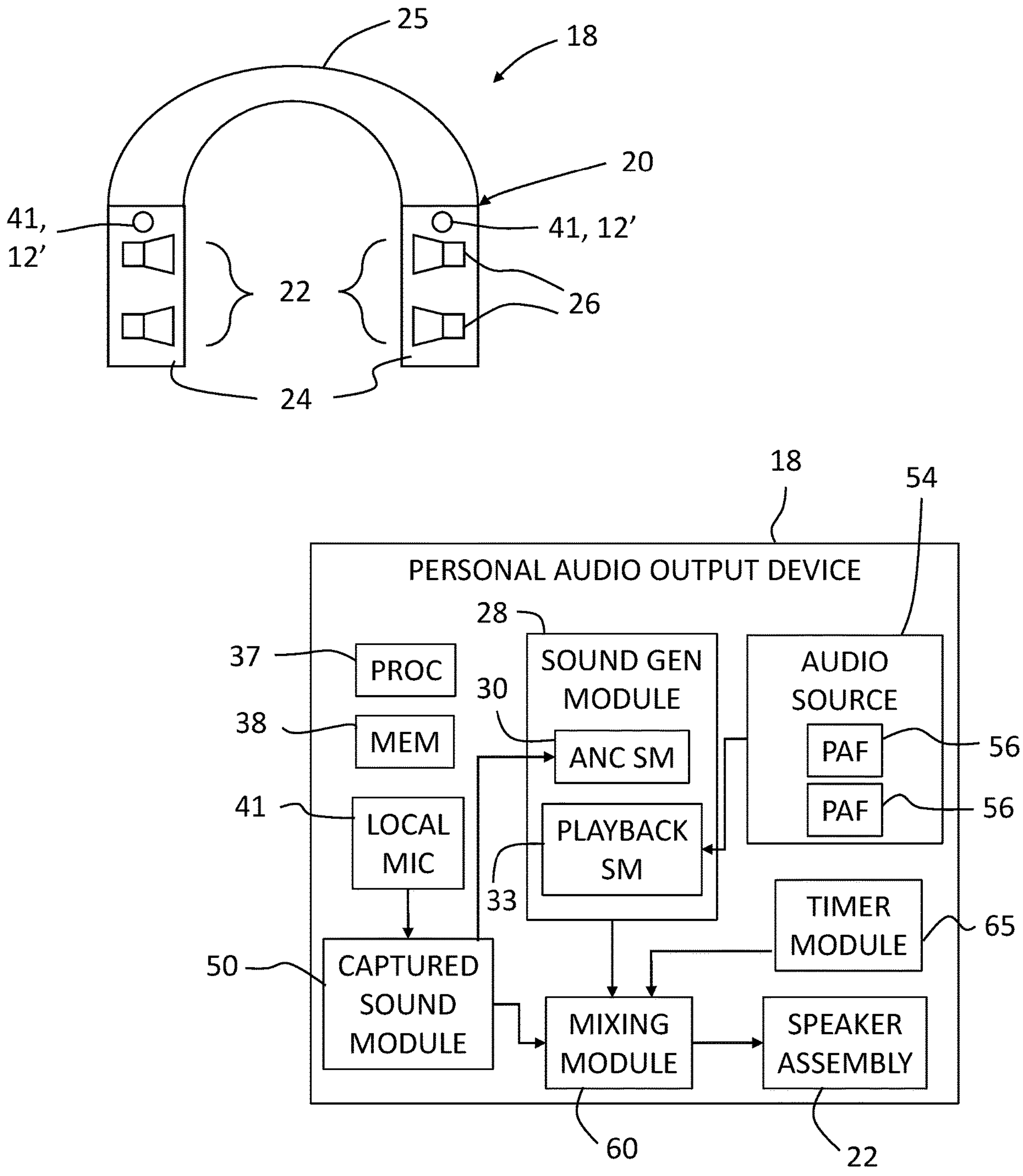
FIG. 5 is a schematic diagram of another arrangement of personal audio output device of communication system of the present invention.

FIG. 5 shows another arrangement of the personal audio output device, which is capable of performing, at minimum, substantially the same functionality as that described with reference to FIG. 3. In FIG. 5, there is shown a captured sound module 50 in the housing 18 and operatively connected to the microphone, indicated at 41 and which may alternatively be indicated at 12' when there is not distinct microphone for the speaker. The captured sound module 50 is configured to receive, as input thereto, the sound captured by the microphone 12', 41 and to form a first sound signal including the sound captured by the microphone. In other words, the captured sound module 50 processes the raw sound signal captured by the microphone and outputs a processed version of the sound signal from the microphone. In the illustrated arrangement, the processing comprises amplification of the input signal. In other arrangements, further processing or other forms of processing may be performed on the raw sound signal captured by the microphone, for example conditioning or filtration.

Additionally, the personal audio output device 18 includes a sound generation module 28 in the housing and operatively connected to an audio source 54 storing one or more prerecorded audio files 56. The sound generation module 28 is configured to output a second sound signal from the audio source. That is, generally speaking, the sound generation module 28 is configured to playback a selected one of the audio files from the audio source. In the illustrated arrangement, the audio source is local to the personal audio output device so as to be supported in the housing and stores the prerecorded audio files locally. In such an arrangement, the audio source is a non-transitory readable storage medium, such as an SD card, which is communicatively coupled, typically hardwired, to the sound generation module to retrieve the files 56 therefrom. In other arrangements, the local audio source 54 comprises a transceiver configured to wirelessly communicate with a remote (cloud) computing device to wirelessly receive, such as by streaming, audio files stored on the remote computing device. It will be appreciated that when the communication system is used to assist listeners in focusing on the speaker, the second sound signal from the audio source is associated with sound wave therapy.

Furthermore, the personal audio output device comprises a mixing module 60 in the housing and operatively connected to the captured sound module 50 and the sound generation module 28 so as to be configured to receive, as input thereto, the first and second sound signals. The mixing module 60 is configured to form a combined sound signal based on inputs (that is, input signals) to the module, in this case including the first and second sound signals, and an output of the mixing module is operatively connected to the speaker assembly 22 to emit the combined sound signal to the respective listener. For example, combination or mixing of sound signals at the mixing module is performed by superposition of the input sound signals, that is at least the first and second sound signals.

In one arrangement, the one or more prerecorded audio files 56 include at least one of (i) coloured noise, for example white noise or brown noise, and (ii) theta brain wave audio signals. As shown in FIG. 5, there are a plurality of prerecorded audio files 56 at the audio source 54 which are different.

When the microphone 12 is distinct from the at least one personal audio output device, as in the arrangement represented by FIG. 1, the captured sound module of the respective personal audio output device and the microphone are operatively wirelessly interconnected. However, when the personal audio output device is configured to provide active noise cancelling functionality, the device still has a local microphone 41 which may be connected to the captured sound module 50. In such an arrangement, with distinct microphone 12 and a local microphone operated in association with active noise cancelling functionality, the captured sound module may have different submodules for distinctly receiving each of the sources of captured sound and processing these captured sound sources independently of one another.

In an arrangement including the distinct microphone separate from the personal audio output device(s), the captured sound module 28 and the microphone 12 are operatively wirelessly interconnected by Bluetooth.

Each of the captured sound module 50 and the sound generation module 28 are configured to amplify an input signal thereto independently of one another. That is, volumes of the first and second sound signals, that is volumes of the captured sound from the speaker and of the prerecorded audio files, are independently controllable. The personal audio output device may be configured to receive user input as to level of amplification of each of the first and second sound signals by buttons presented on and supported by the housing of the audio output device, which are operatively connected to the respective modules to be in communication therewith to transmit a desired level of amplification, that is a desired volume.

To aid with time blindness or perception, the respective personal audio output device further includes a timer module 65 configured to count an elapsed time and operatively connected to the speaker assembly 22, for example via the mixing module 60, to output, to the respective listener, an audible signal representative of the elapsed time. That is, the timer 65 is independently operable of the captured sound module 50 and the sound generation module 28. There is preferably provided a button in operative association with the timer 65 to toggle its state (as on/off). In the illustrated arrangement, the timer 65 is configured to select from a range of discrete predetermined time lengths to which to count, and to select from time increments at which the listener is notified of an elapsed portion of the total countdown duration.

When the sound generation module includes a playback submodule 33 configured to output sound from the audio source 54, and thus operative connected thereto to, the sound generation module 28 may further include an active noise cancellation submodule 30 operatively connected to the microphone and configured to form noise-cancelling sound responsive to ambient sound captured by the microphone. When the speaker microphone is incorporated into the housings of each of the personal audio output devices, the active noise cancellation submodule may include a machine learning algorithm configured to process the captured sound to identify ambient noise from a common signal also including the sound from the speaker, so as to be able to generate suitable anti-noise. For operative connection to the microphone to receive a captured sound signal therefrom based on which to form anti-noise, the active noise cancellation submodule 30 may be operatively connected to the captured sound module, or a distinct submodule thereof specifically receiving and processing sound for the purposes of generating anti-noise, to receive a signal representative of ambient noise.

The scope of the claims should not be limited by the preferred embodiments set forth in the examples but should be given the broadest interpretation consistent with the specification as a whole.

The invention claimed is:

1. A communication system for transmitting sound from a person speaking to one or more listeners comprising:

a microphone configured to capture sound from the person speaking;

at least one personal audio output device respectively configured to be worn by the one or more listeners, wherein the at least one personal audio output device is in operative communication with the microphone to receive the sound therefrom, wherein said at least one personal audio output device comprises:

a housing configured to be worn by a respective one of the listeners, a speaker assembly supported by the housing and arranged to be located adjacent ears of the respective listener for emitting sound to the listener's ears;

a captured sound module in the housing and operatively connected to the microphone so as to be configured to receive, as input thereto, the sound captured by the microphone, wherein the captured sound module is configured to form a first sound signal including the sound captured by the microphone;

a sound generation module in the housing and operatively connected to an audio source storing one or more prerecorded audio files, wherein the sound generation module is configured to output a second sound signal from the audio source which is audible to the respective listener; and a mixing module in the housing and operatively connected to the captured sound module and the sound generation module so as to be configured to receive, as input thereto, the first and second sound signals, wherein the mixing module is configured to form a combined simultaneous sound signal including both the first and second sound signals, and wherein an output of the mixing module is operatively connected to the speaker assembly to emit the combined simultaneous sound signal to the respective listener;

and wherein there is provided an arrangement for adjusting volumes of the first and second sound signals independently.

2. The communication system of claim 1 wherein, in combination with the audio source, the one or more prerecorded audio files include at least one of (i) coloured noise and (ii) theta brain wave audio signals.

3. The communication system of claim 1 wherein the at least one personal audio output device further includes a timer module configured to count an elapsed time and operatively connected to the speaker assembly to output, to the respective listener, an audible signal representative of the elapsed time.

4. The communication system of claim 1 wherein, when the sound generation module includes a playback submodule configured to output sound from the audio source, the sound generation module further includes an active noise cancellation submodule operatively connected to the microphone and configured to form noise-cancelling sound responsive to ambient sound captured by the microphone.

5. A communication system for assisting listeners with neurodiversity, mental health issues and/or anxiety by transmitting sound from a person speaking to one or more of said listeners, the system comprising:

a microphone configured to capture sound from the person speaking;

at least one personal audio output devices respectively configured to be worn by a respective one of the listeners, wherein said at least one personal audio output device is in operative communication with the microphone to receive the sound therefrom;

wherein the at least one personal audio output device comprises:

a housing configured to be worn by a respective one of the listeners, a speaker assembly supported by the housing and arranged to be located adjacent ears of the respective listener for emitting sound to the listener's ears;

a captured sound module in the housing and operatively connected to the microphone so as to be configured to receive, as input thereto, the sound captured by the microphone, wherein the captured sound module is configured to form a first sound signal including the sound captured by the microphone;

a sound generation module in the housing and operatively connected to an audio source storing one or more prerecorded audio files, wherein the sound generation module is configured to output a second sound signal from the audio source which is audible to the respective listener; and a mixing module in the housing and operatively connected to the captured sound module and the sound generation module so as to be configured to receive, as input thereto, the first and second sound signals, wherein an output of the mixing module is operatively connected to the speaker assembly to emit the first and second sound signals to the respective listener;

wherein the sound generation module and the mixing module form a system for assisting the listener with said neurodiversity, mental health issues and/or anxiety by adding to the first sound signal the audible second sound signal to form a combined simultaneous sound signal including both the first and second sound signals which are both audible to the listener;

wherein the second sound signal is selected to provide said assistance to the listener with neurodiversity, mental health issues and/or anxiety by superimposing the second sound signal which contains focus enhancing sounds for the listener on the first sound signal from the person speaking;

and wherein there is provided an arrangement for adjusting volumes of the first and second sound signals independently.

6. The communication system of claim 5 wherein the at least one personal audio output device further includes a timer module configured to count an elapsed time and operatively connected to the speaker assembly to output, to the respective listener, an audible signal representative of the elapsed time.

7. The communication system of claim 5 wherein, when the sound generation module includes a playback submodule configured to output sound from the audio source, the sound generation module further includes an active noise cancellation submodule operatively connected to the microphone and configured to form noise-cancelling sound responsive to ambient sound captured by the microphone.

8. A communication system for assisting listeners with neurodiversity, mental health issues and/or anxiety by transmitting sound from a person speaking to one or more of said listeners, the system comprising:

a microphone configured to capture sound from the person speaking;

at least one personal audio output devices respectively configured to be worn by a respective one of the listeners, wherein said at least one personal audio output device is in operative communication with the microphone to receive the sound therefrom;

wherein the at least one personal audio output device comprises:

a housing configured to be worn by a respective one of the listeners, a speaker assembly supported by the housing and arranged to be located adjacent ears of the respective listener for emitting sound to the listener's ears;

a captured sound module in the housing and operatively connected to the microphone so as to be configured to receive, as input thereto, the sound captured by the microphone, wherein the captured sound module is configured to form a first sound signal including the sound captured by the microphone;

a sound generation module in the housing and operatively connected to an audio source storing one or more prerecorded audio files, wherein the sound generation module is configured to output a second sound signal from the audio source which is audible to the respective listener; and a mixing module in the housing and operatively connected to the captured sound module and the sound generation module so as to be configured to receive, as input thereto, the first and second sound signals, wherein an output of the mixing module is operatively connected to the speaker assembly to emit the first and second sound signals to the respective listener;

wherein the sound generation module and the mixing module form a system for assisting the listener with said neurodiversity, mental health issues and/or anxiety by adding to the first sound signal the audible second sound signal to form a combined simultaneous sound signal including both the first and second sound signals which are both audible to the listener;

wherein the second sound signal is selected to comprise focus enhancing sounds including at least one of (i) coloured noise and (ii) theta brain wave audio signals and to provide thereby said assistance to the listener with neurodiversity, mental health issues and/or anxiety by superimposing the second sound signal on the first sound signal from the person speaking;

and wherein there is provided an arrangement for adjusting volumes of the first and second sound signals independently.

9. The communication system of claim 8 wherein the at least one personal audio output device further includes a timer module configured to count an elapsed time and operatively connected to the speaker assembly to output, to the respective listener, an audible signal representative of the elapsed time.

10. The communication system of claim 8 wherein, when the sound generation module includes a playback submodule configured to output sound from the audio source, the sound generation module further includes an active noise cancellation submodule operatively connected to the microphone and configured to form noise-cancelling sound responsive to ambient sound captured by the microphone.

11. A method for assisting a plurality of listeners with neurodiversity, mental health issues and/or anxiety comprising:

providing a microphone configured to capture sound from a person speaking;

providing at least one personal audio output device respectively configured to be worn by a respective one of the listeners, wherein the at least one personal audio output device is in operative communication with the microphone to receive the sound therefrom;

wherein each of the at least one personal audio output device comprises:

a housing configured to be worn by a respective one of the listeners, a speaker assembly supported by the housing and arranged to be located adjacent ears of the respective listener for emitting sound to the listener's ears;

a captured sound module in the housing and operatively connected to the microphone so as to be configured to receive, as input thereto, the sound captured by the microphone, wherein the captured sound module is configured to form a first sound signal including the sound captured by the microphone;

a sound generation module in the housing and operatively connected to an audio source storing one or more prerecorded audio files, wherein the sound generation module is configured to output a second sound signal from the audio source which is audible to the respective listener; and a mixing module in the housing and operatively connected to the captured sound module and the sound generation module so as to be configured to receive, as input thereto, the first and second sound signals, wherein an output of the mixing module is operatively connected to the speaker assembly to emit the first and second sound signals to the respective listener;

and assisting the listener with said neurodiversity, mental health issues and/or anxiety by mixing the first sound signal and the audible second sound signal to form a combined simultaneous sound signal including both the first and second sound signals which are both audible to the listener and by selecting a content of the second sound signal to include focus enhancing sounds so as to provide said assistance to the listener with neurodiversity, mental health issues and/or anxiety by superimposing the second sound signal on the first sound signal from the person speaking;

and adjusting volumes of the first and second sound signals independently.

12. The method of claim 11 wherein the selected content of the second sound signal comprises at least one of coloured noise and theta brain wave audio signals.

13. The method of claim 12 wherein the at least one personal audio output device further includes a timer module configured to count an elapsed time and operatively connected to the speaker assembly to output, to the respective listener, an audible signal representative of the elapsed time.

14. The method of claim 12 wherein, when the sound generation module includes a playback submodule configured to output sound from the audio source, the sound generation module further includes an active noise cancellation submodule operatively connected to the microphone and configured to form noise-cancelling sound responsive to ambient sound captured by the microphone.

* * * * *